United States Patent [19]

Torres

[11] Patent Number: 4,975,690

[45] Date of Patent: Dec. 4, 1990

[54] METHOD FOR CONCURRENT DATA ENTRY AND MANIPULATION IN MULTIPLE APPLICATIONS

[75] Inventor: Robert J. Torres, Colleyville, Tex.

[73] Assignee: IBM Corporation, Armonk, N.Y.

[21] Appl. No.: 268,148

[22] Filed: Nov. 7, 1988

[51] Int. Cl.$^5$ .............................................. G09G 5/14
[52] U.S. Cl. .................................... 340/721; 340/706
[58] Field of Search ............... 340/724, 703, 707, 747, 340/706, 709, 710, 712, 721

[56] References Cited

U.S. PATENT DOCUMENTS

| | | | |
|---|---|---|---|
| 4,642,790 | 2/1987 | Minshull et al. | 340/724 |
| 4,665,555 | 5/1987 | Alker et al. | 340/724 |
| 4,780,709 | 10/1988 | Randall | 340/724 |
| 4,780,710 | 10/1988 | Tatsumi | 340/724 |
| 4,794,386 | 12/1988 | Bedrij et al. | 340/724 |
| 4,814,884 | 3/1989 | Johnson et al. | 340/724 |

Primary Examiner—Jeffery A. Brier
Attorney, Agent, or Firm—Andrew J. Dillon

[57] ABSTRACT

A method is disclosed for concurrent data entry and manipulation in a plurality of computer applications which are simultaneously active and displayed in a plurality of viewports or "windows." A display attribute is set in selected windows which permits the utilization of a "global" cursor. After designating a location within each selected window, a global cursor is positioned therein. Thereafter, data entered at or manipulated by a single global cursor will be automatically and concurrently entered at or manipulated within each window having a global cursor positioned therein.

8 Claims, 10 Drawing Sheets

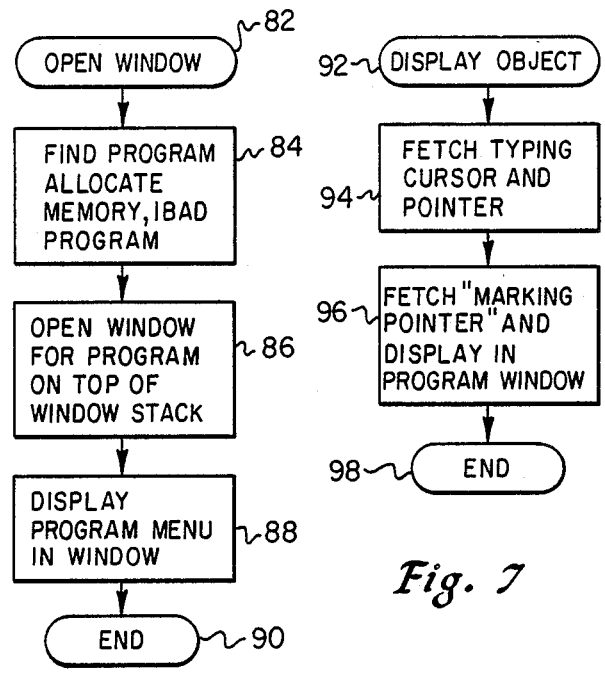
Fig. 6
Fig. 7
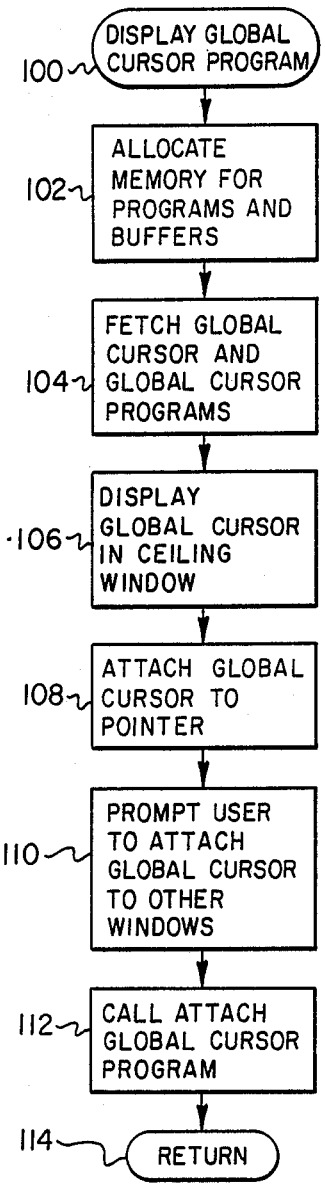
Fig. 8

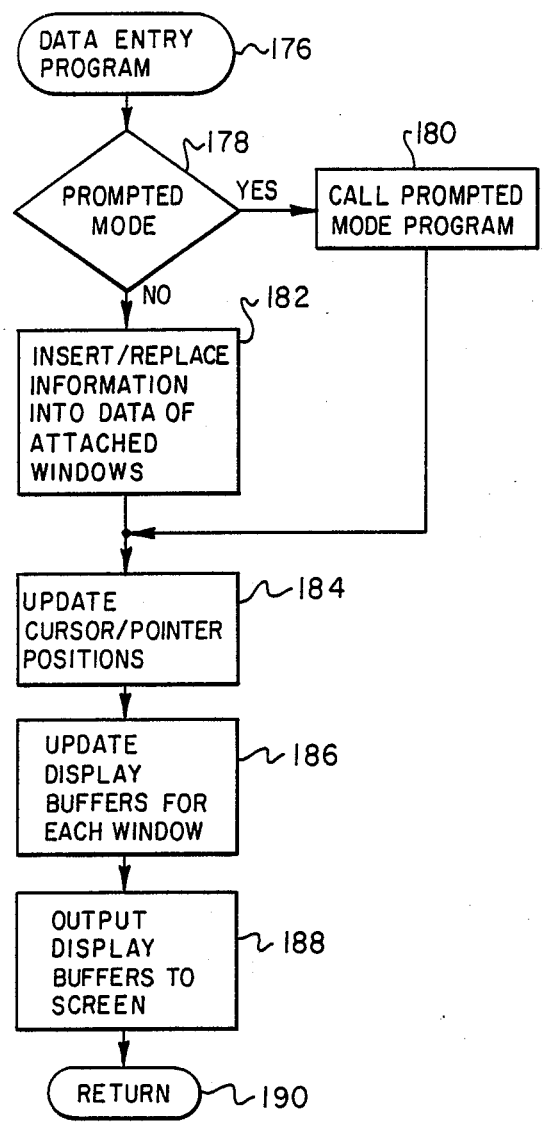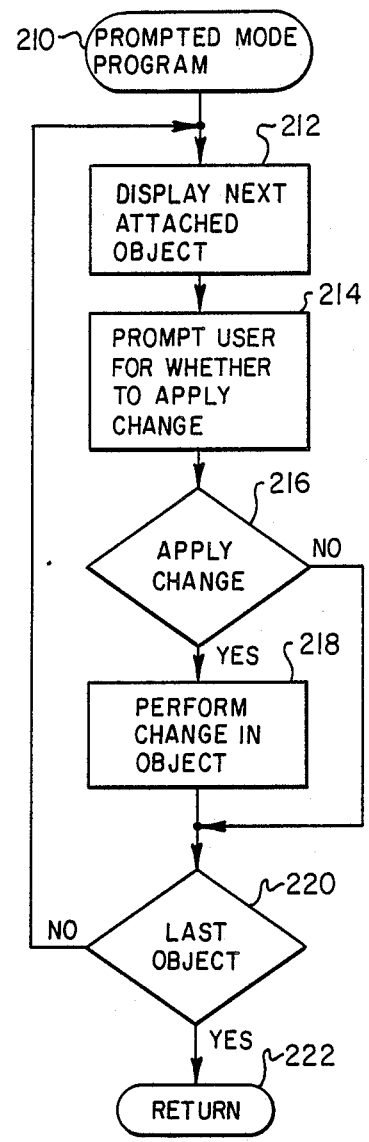
Fig. 12
Fig. 14

METHOD FOR CONCURRENT DATA ENTRY AND MANIPULATION IN MULTIPLE APPLICATIONS

BACKGROUND OF THE INVENTION

1. Technical Field

This invention relates in general to methods for inputting common data into a plurality of computer application programs and in particular to methods for automatically and concurrently entering common data into a plurality of computer application programs. Still more particularly, this invention relates to methods which permit the concurrent manipulation of common data which is present within a plurality of computer application programs.

2. Background Art

The manipulation, alteration, or deletion of data blocks within a computer stored document is well known in the prior art. There exist many programs which allow a user to connect a single cursor to a window and perform actions based upon the location of that cursor. For example, the user may enter data or text, perform a search for a particular block of data, or perform cut and paste operations within a document within a computer application program. In systems which permit multiple computer applications to be displayed in a plurality of windows, the user may typically locate a cursor within one window for such operations and thereafter move the cursor to a second window for similar operations.

Many windowing systems allow multiple applications to run in windows which are separate from other applications in the system. Each application may use a cursor which is common to other applications, such as a text entry cursor, or each application may have its own unique cursor. Typically however, only one cursor is active at one time. Additionally, each cursor may operate only in one window at one time.

Each known approach in the prior art includes several shortfalls from the user's point of view. For example, concurrent and simultaneous interactive access of multiple objects displayed in a plurality of windows is not allowed with known systems. Additionally, users may not access multiple objects of the same type concurrently. Known systems also do not permit users to perform automatically a single set of operations concurrently and in tandem on multiple objects of the same type which are displayed in a plurality of windows.

As a result of these problems additional time is required for a user to learn how to access and edit information contained within a plurality of windows which may utilize different techniques. As a result, the user must learn how to perform such actions within each window or computer application. Those skilled in the art will appreciate that such techniques are generally unique to a particular application and may be inconsistent across applications, leading to learning problems and possible user errors.

Users must also devote additional time to learning the required techniques which are known in the prior art which permit users to perform cross-window operations. For example, search or cut and paste are two such operations which are typically utilized in multiple windows. As a result of the difficult techniques required for such operations, users often commit errors in attempting to perform such cross-window operations.

One special case does exist wherein data may be simultaneously input into more than one location. This case involves the utilization of so-called "relational" databases wherein a record is shared by more than one database. In such applications data entered into a single record will be present in each database within the relational database which shares that record; however, this application is a special case and does not permit the efficient entry of common data into more than one unrelated computer application program.

Recently a technique has been proposed wherein data may be simultaneously entered into a plurality of active computer application programs by physically locating multiple windows in a manner such that a portion of each window is overlapped and shared with the remaining windows. A display attribute associated with each window is then utilized to determine whether or not that window will "share" the common overlapping area with other overlapping or overlapped windows. Thereafter, data input into the common overlapping area is shared by the computer application programs represented in those windows.

While this technique does represent a method wherein common data may be entered into a plurality of unrelated computer application programs, it requires that the windows be manipulated in such a manner so as to completely and accurately overlap the area at which point data is desired to be entered for each window.

It should therefore be apparent that a need exists for a method whereby common data may be accurately input into a plurality of computer application programs which are simultaneously active and displayed on a computer system in a plurality of windows without the necessity of accurately aligning the windows to a predetermined display relationship. Additionally, there exists a need for a technique whereby data may be manipulated concurrently within a plurality of computer application programs without the necessity of entering and activating each window in a sequential manner.

SUMMARY OF THE INVENTION

It is therefore one object of the present invention to provide an efficient method of utilizing multiple computer application programs in a multi-tasking computer system wherein common data may be simultaneously input into a plurality of programs.

It is another object of the present invention to provide an efficient method of entering data into multiple computer application programs which does not require the user to graphically align multiple windows in an overlapping display.

It is yet another object of the present invention to provide an improved method whereby data may be manipulated concurrently within a plurality of computer application programs which are simultaneously active and displayed on a computer system in a plurality of windows.

The foregoing objects are achieved as is now described. A display attribute is set in a selected window which permits the utilization of a "global" cursor. After designating a location within each selected window, the global cursor is positioned therein. Thereafter, data entered at or manipulated utilizing a single global cursor will be automatically and concurrently entered at or manipulated within each window having a global cursor positioned therein. In this manner, the user may accurately and simultaneously enter common data into a plurality of computer application programs or manipulate data across a wide variety of computer application programs without the necessity of sequentially operating on each program in turn.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 is a logic flow diagram of a window opening program which may be utilized with the method of the present invention;

FIG. 7 is a logic flow diagram of a display document program which may be utilized with the method of the present invention;

FIG. 8 is a logic flow diagram of a global cursor program which may be utilized with the method of the present invention;

FIG. 12 is a logic flow diagram of a data entry program which may be utilized with the method of the present invention;

FIG. 14 is a logic flow diagram of a prompted mode program which may be utilized with the method of the present invention.

DETAILED DESCRIPTION OF THE PREFERRED EMBODIMENT

Figure 1:
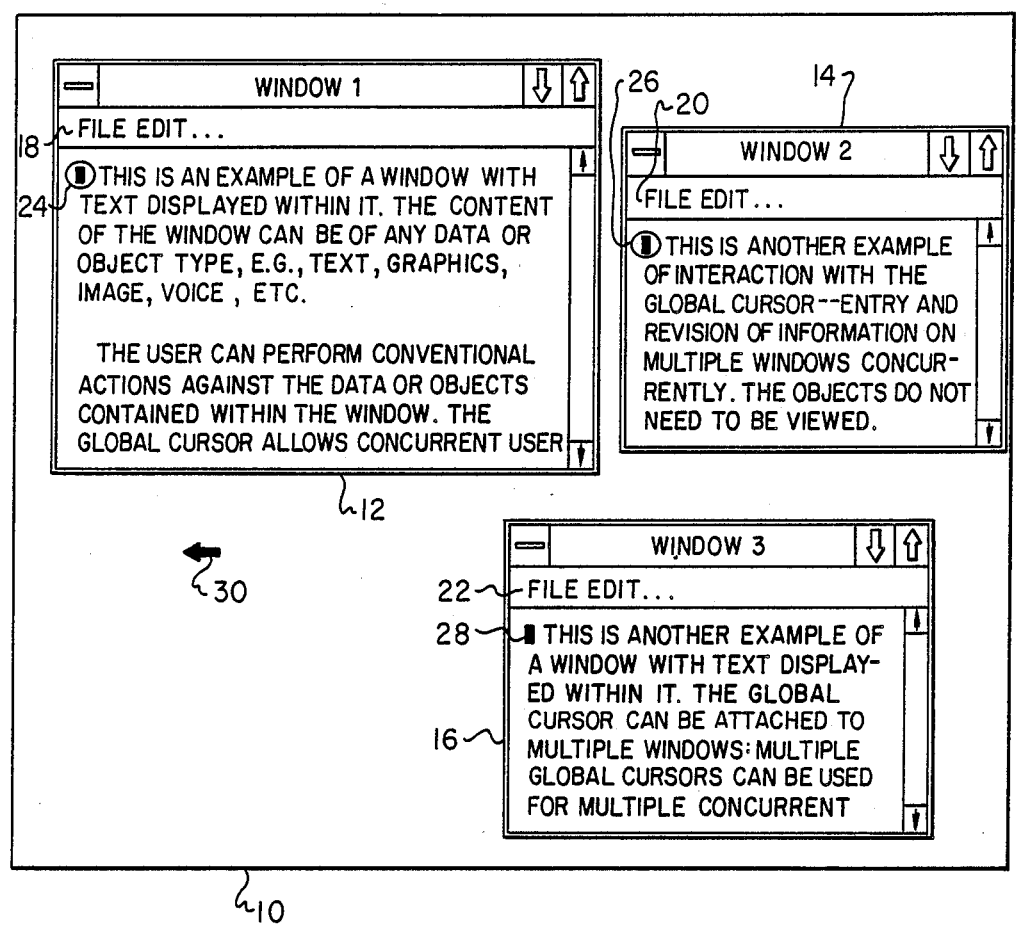
FIG. 1 is a pictorial representation of a computer display having a plurality of windows in a multi-tasking computer system.

With reference now to the figures and in particular with reference to FIG. 1, there is depicted a pictorial representation of a computer display 10 having a plurality of windows 12, 14 and 16 displayed in a multi-tasking computer system. As may be seen, each window includes a command menu bar 18, 20 and 22 respectively. Those skilled in the art will appreciate that by utilizing a pull-down command menu bar such as depicted in FIG. 1, it is possible for a user to graphically indicate a particular task which he desires to perform.

In accordance with an important aspect of the present invention, it can be seen that window 12 includes a global cursor 24. Similarly, window 14 includes a global cursor 26 while window 16 includes an ordinary cursor 28. The substitution of a global cursor for an ordinary cursor in a multi-tasking computer system, such as that depicted in FIG. 1, may be simply and easily accomplished utilizing a pointer 30. Those skilled in the art will appreciate that pointer 30 may be controlled by a pointing device, such as a mouse. of course, other graphic indicating devices such as light pens or touch sensitive screens may also be utilized to indicate those windows in which it is desired to substitute a global cursor for an ordinary cursor.

Figure 2:
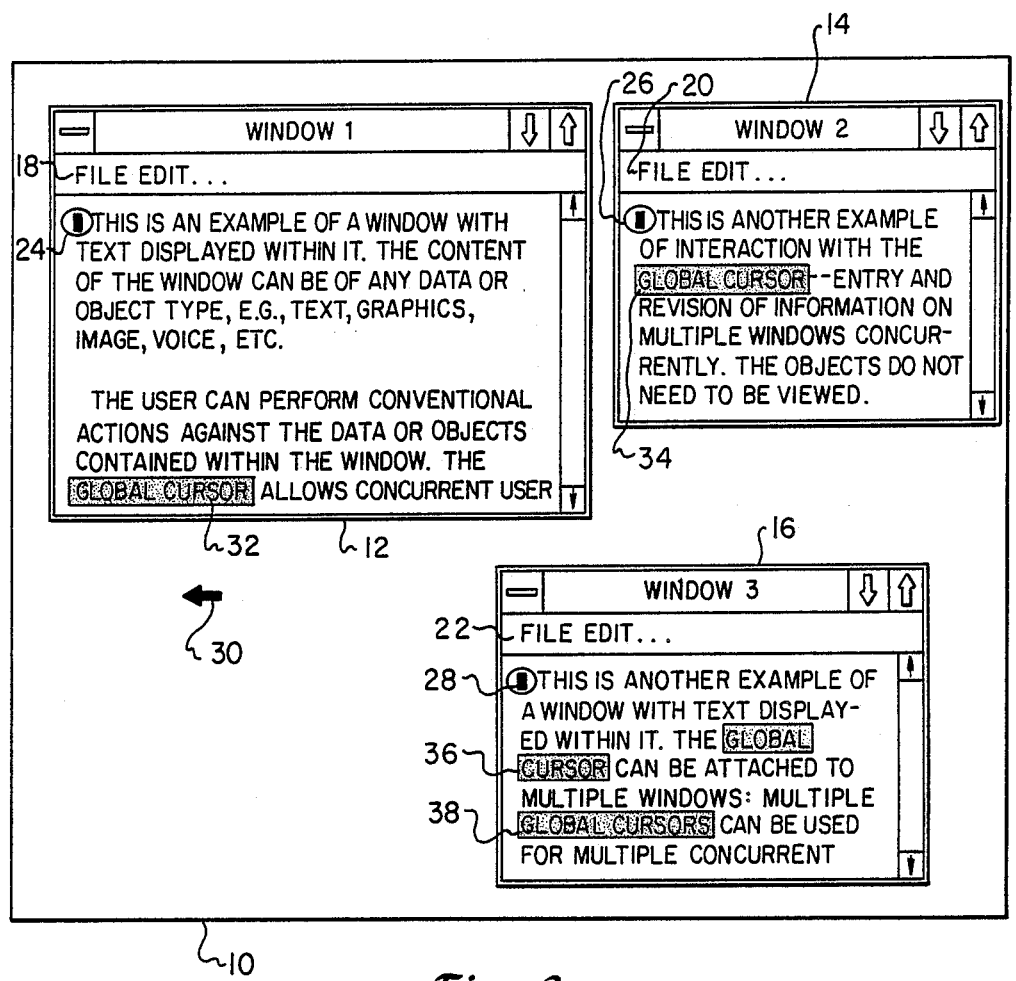
FIG. 2 is a pictorial representation of a computer display having a plurality of windows in a multi-tasking computer system wherein a single search operation is conducted utilizing the method of the present invention.

Referring now to FIG. 2, there is depicted a pictorial representation of a computer display 10 having a plurality of windows 12, 14 and 16 displayed in a multi-tasking computer system wherein a single search operation is conducted utilizing the method of the present invention. As may be seen, each window in FIG. 2 includes a global cursor 24, 26 or 28. In accordance with text search techniques well known in the prior art, the command menu bar in a particular window is selected and the search function is elected by the user. In the pictorial representation depicted in FIG. 2, the user has selected a search function for the phrase "global cursor." As may be seen, in each and every window in which a global cursor exists the search function has located and highlighted the phrase "global cursor" at each location wherein that phrase is located. As may be seen, the phrase "global cursor" may be highlighted by utilizing reverse video, as indicated at reference numerals 32, 34, 36, and 38. In this manner, those skilled in the art will appreciate that the global cursor technique disclosed herein permits the concurrent and simultaneous interactive access of multiple objects displayed in a plurality of windows.

Figure 3:
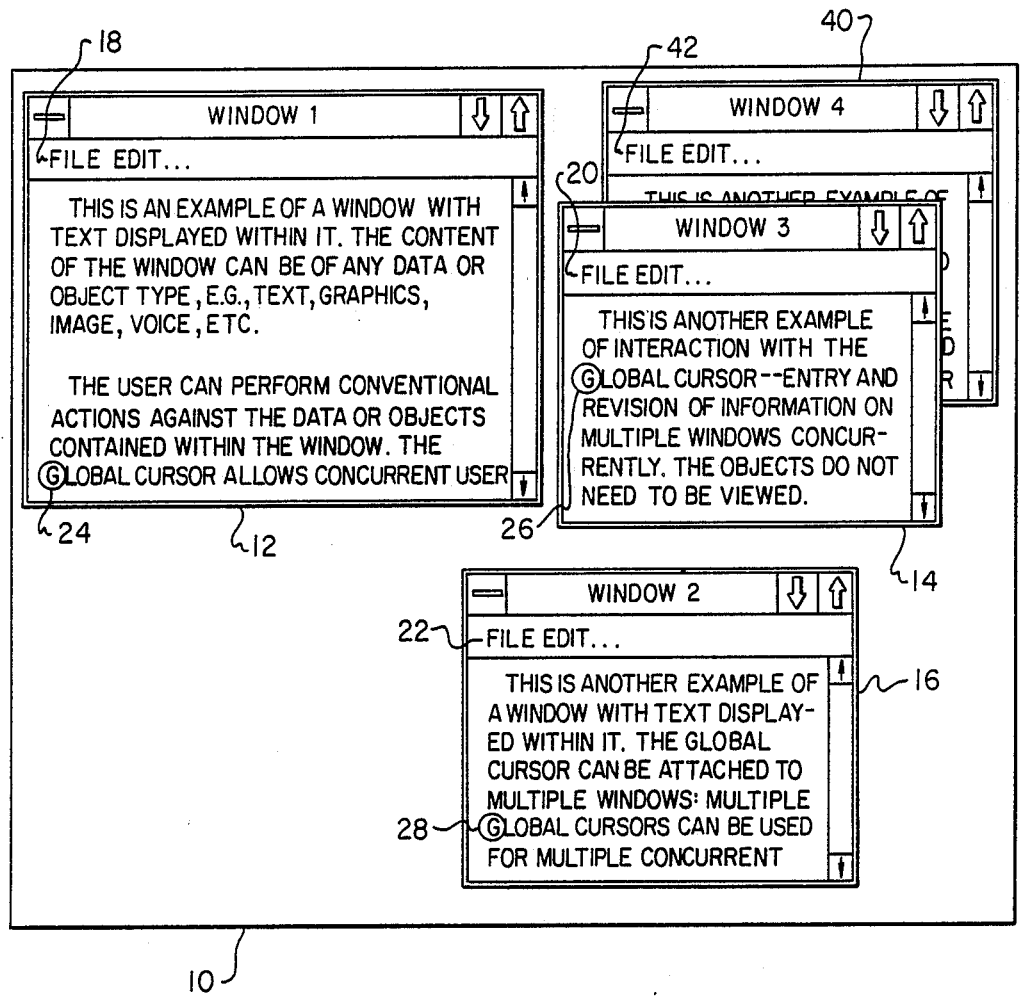
FIG. 3 is a pictorial representation of a computer display having a plurality of windows in a multi-tasking computer system wherein data entry is simultaneously accomplished in a plurality of windows utilizing the method of the present invention.

Referring now to FIG. 3, there is depicted a pictorial representation of a computer display 10 having a plurality of windows 12, 14, 16, and 40 displayed in a multi-tasking computer system wherein data entry is simultaneously accomplished in the plurality of windows utilizing the method of the present invention. As may be seen, global cursors 24, 26 and 28 have been located at various points within windows 12, 14 and 16. At this point, data may be entered into each window, either by an additive or substitutive technique known in most word processing functions and such data will be added concurrently and automatically in each remaining window in which a global cursor is active. As is illustrated, window 40 is substantially overlapped by window 14; however, it is anticipated in accordance with the method of the present invention that the presence of a global cursor within window 40 will cause the concurrent and automatic entry of data into window 40 whether or not the position of a global cursor therein is visible.

Figures 4, 5:
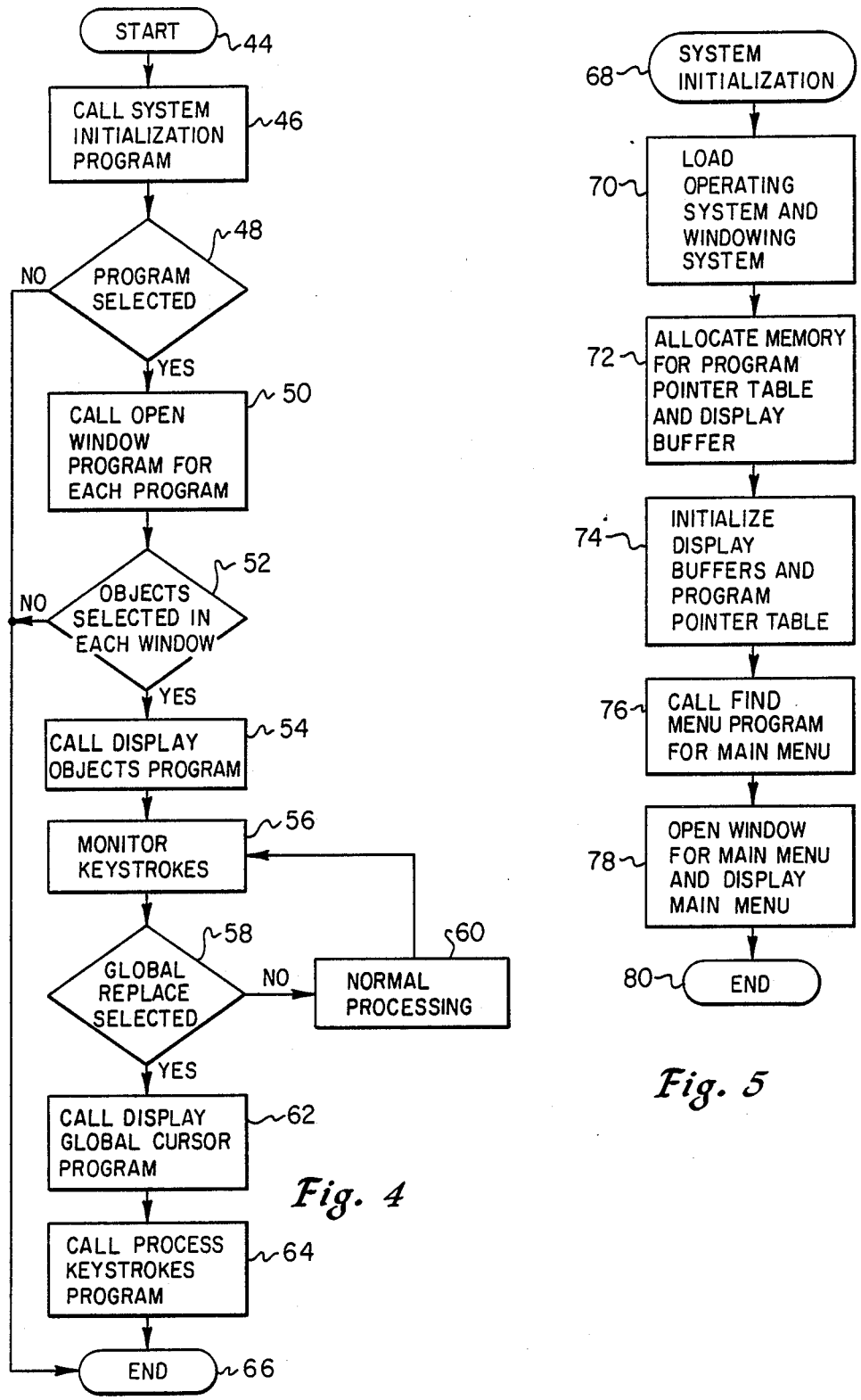
FIG. 4 is a logic flow diagram of the method of the present invention.
FIG. 5 is a logic flow diagram of a system initialization program which may be utilized with the method of the present invention.

Referring now to FIG. 4, there is depicted a logic flow diagram of the method of the present invention. As can be seen, the process begins at block 44 and thereafter the system initialization program is called, as illustrated at block 46. Block 48 is utilized to illustrate the determination of whether or not a program has been selected and if not the process terminates, as illustrated in block 66. In the event the user has selected a program, as determined by block 48, then block 50 is utilized to depict the calling of the open window program for each program thus selected.

Next, block 52 is utilized to depict a determination of whether or not an object has been selected within an open window. If no object has been selected then the process terminates, as illustrated by block 66. In the event an object has been selected, then block 54 depicts the calling of the display objects program. Next, block 56 illustrates the monitoring of the user's keystrokes to determine whether or not the user has elected to replace the normal cursor with a global cursor, in accordance with the method of the present invention. If the global cursor has not been selected, then block 60 illustrates the processing of the commands associated with the user's keystrokes in the normal manner and the process returns to block 56 to continue monitoring user keystrokes.

In the event the user has elected to replace the normal cursor present within a window with a global cursor, then block 62 depicts the calling of the display global cursor program. Next, block 64 illustrates the calling of the process keystrokes program, which is utilized to process user keystrokes in accordance with the global cursor method of the present invention. Thereafter, the process terminates, as illustrated in block 66.

With reference now to FIG. 5, there is depicted a logic flow diagram of a system initialization program which may be utilized with the method of the present invention. As may be seen, the process begins at block 68 and thereafter block 70 illustrates the loading of the operating system and windowing system which are utilized with the multi-tasking computer system of the present invention. Next, block 72 illustrates the allocation of memory for the program pointer table and display buffer. Thereafter, block 74 depicts the initialization of the display buffers and the program pointer table. Block 76 now illustrates the calling of the FIND menu program for the main menu while block 78 illustrates the opening of the window for the main menu and the displaying of the main menu program. Thereafter, the process terminates as illustrated in block 80.

Referring now to FIG. 6, there is depicted a logic flow diagram of a window opening program which may be utilized in accordance with the method of the present invention. The window opening program begins at block 82 and thereafter block 84 illustrates the location of the appropriate program, the allocation of a selected amount of memory and the loading of the program. Next, block 86 depicts the opening of a window for the selected program on top of the current window stack. Those ordinarily skilled in the art will appreciate that in multi-tasking computer systems when multiple windows are opened it is typical for the last window opened to be displayed initially in an uppermost position on the screen above previously opened windows. Finally, block 88 illustrates the displaying of the program menu in the window and this process then terminates, as illustrated in block 90.

With reference now to FIG. 7, there is depicted a logic flow diagram of a display object program which may be utilized with the method of the present invention. As above, the process begins at block 92 and thereafter block 94 is utilized to illustrate the fetching of the typing cursor and pointer. Next, the marking pointer is fetched and displayed in the program window. Thereafter, this process terminates as illustrated in block 98.

Referring now to FIG. 8, there is depicted a logic flow diagram of a display global cursor program which may be utilized with the method of the present invention. The display global cursor program begins as illustrated in block 100 and thereafter block 102 depicts the allocation of memory for the program and associated buffers. Next, block 104 illustrates the fetching of the global cursor and the global cursor program. Block 106 is utilized to depict the displaying of the global cursor in the window which has been designated by the user, as is illustrated in FIG. 1.

Next, the global cursor is attached to a pointer, as depicted in block 108 and the user is then prompted to attach the global cursor to other selected windows, as depicted in block 110. Block 112 illustrates the calling of the attach global cursor program and the process then returns, as illustrated in block 114.

Figure 9:
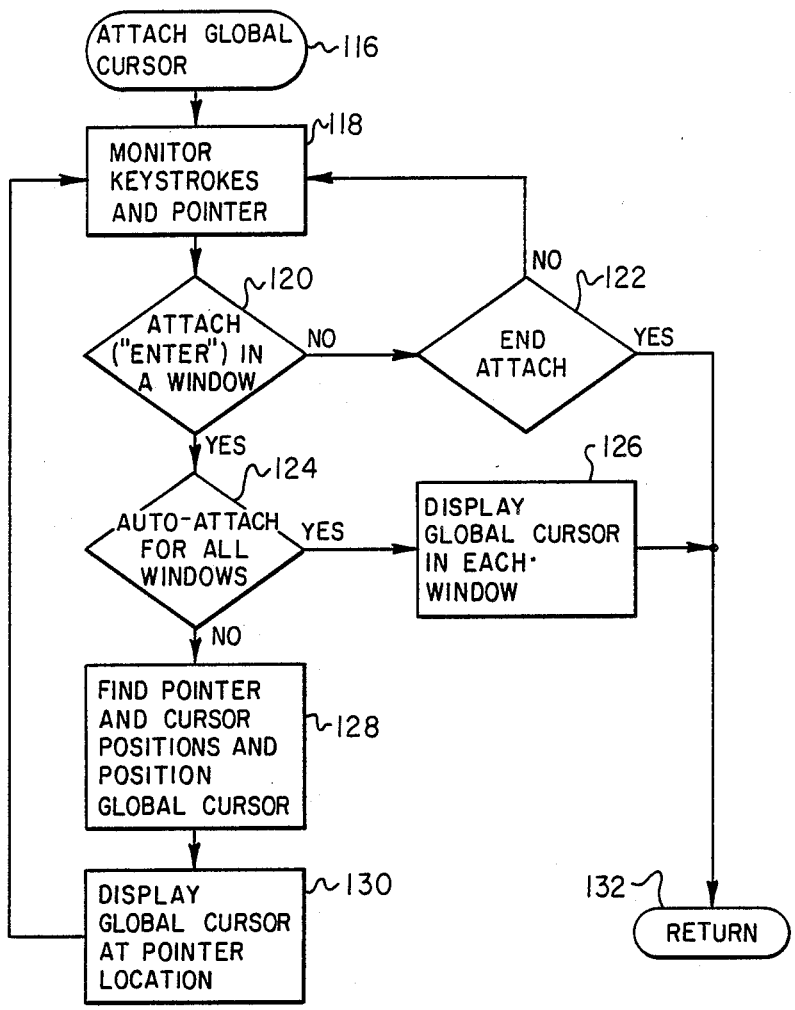
FIG. 9 is a logic flow diagram of a global cursor manipulation program which may be utilized with the method of the present invention.

With reference now to FIG. 9, there is depicted a logic flow diagram of a global cursor manipulation program which may be utilized with the method of the present invention. As may be seen, the process begins at block 116 with the attaching of a global cursor. Block 118 depicts the monitoring of the user's keystrokes and pointer movement to determine whether or not the user desires to attach a global cursor to the window in question. If not, block 122 depicts the determination of whether or not the user desires to end the attach global cursor program. If the user desires to end the attach global cursor program then the process returns, as illustrated in block 132. If, on the other hand, the user does not desire to end the attach global cursor program, then the process returns to block 118 to continue monitoring the user keystrokes and pointer movements.

If block 120 has determined that the user does desire to attach the global cursor to a selected window, then block 124 determines whether or not the user has elected to automatically attach the global cursor to all windows present in the multi-tasking computer system. If so, block 126 depicts the displaying of the global cursor in each window and the process again returns, as illustrated in block 132.

In the event the user does not desire to automatically attach the global cursor to each window within the multi-tasking computer system, then block 128 illustrates the finding of the pointer and cursor positions elected by the user and the positioning of a global cursor at those positions. Next, block 130 illustrates the displaying of a global cursor at those selected pointer locations and thereafter the process returns to block 118 to continue to monitor the user keystrokes. In this manner, the user may select multiple positions to display a global cursor within each of the plurality of windows within the multi-tasking computer system, by utilizing a pointing device suitable for this process.

Figure 10:
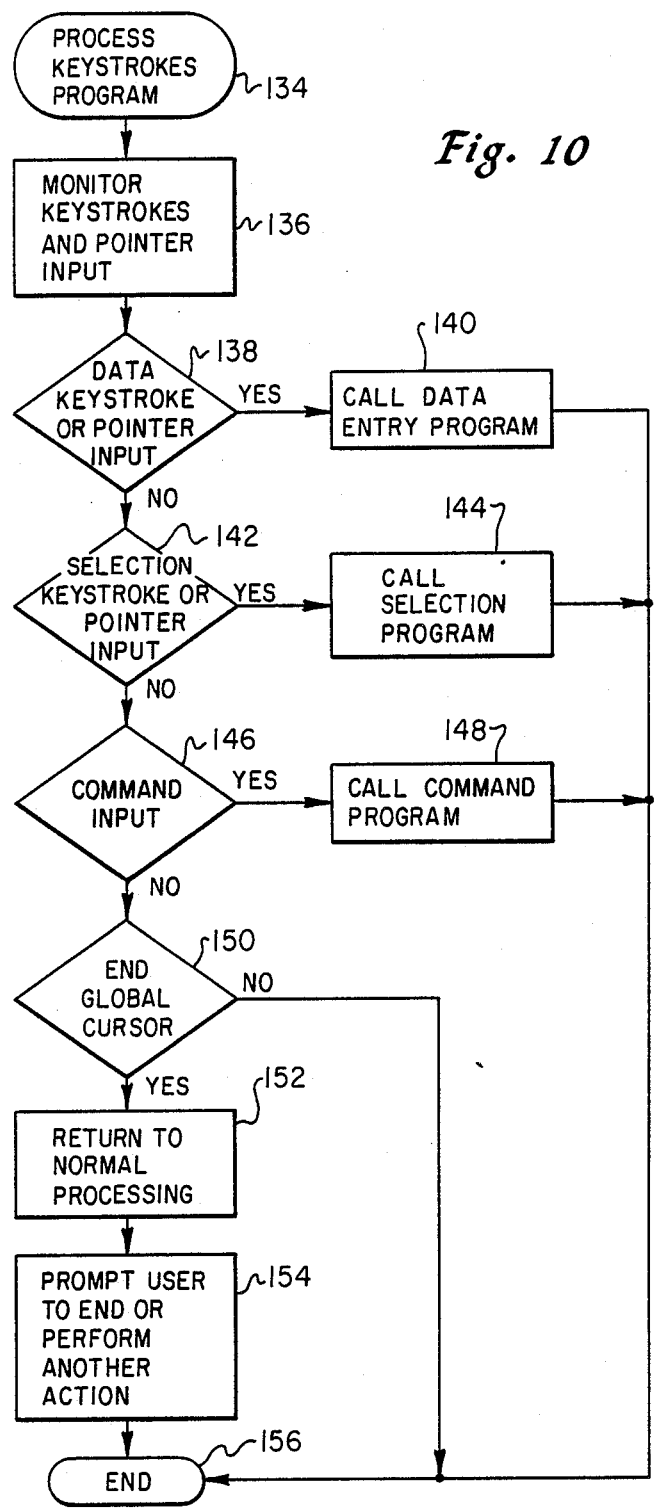
FIG. 10 is a logic flow diagram of a key stroke processing program which may be utilized with the method of the present invention.

Referring now to FIG. 10, there is depicted a logic flow diagram of a keystroke processing program which may be utilized with the method of the present invention. The process keystroke program begins at block 134 and thereafter block 136 is utilized to depict the monitoring of the user's keystroke and pointer inputs. Next, block 138 illustrates a determination of whether or not the keystroke or pointer input is a data entry keystroke or pointer input. If the user is attempting to enter data, then block 140 illustrates the calling of the data entry program and the process terminates, as illustrated in block 156.

In the event the keystroke or pointer input monitored by the process is not a data entry keystroke, then block 142 is utilized to depict a determination of whether or not the keystroke or pointer input is a selection keystroke. If the user has attempted a selection keystroke, then block 144 depicts the calling of the selection program and the process again terminates as illustrated in block 156.

Finally, block 146 depicts the illustration of a determination of whether or not the keystroke or pointer input entered by the user if a command input. If a command input is detected, then block 148 depicts the calling of the command program and the process again terminates as illustrated in block 156.

In the event the user input monitored by the program is not a data keystroke, a selection keystroke, or a command input, then block 150 determines whether or not the user has made a keystroke or pointer input which indicates his desire to end the global cursor program. If not, the process terminates, as illustrated in block 156. In the event the user has entered a keystroke or pointer input indicating his desire to end the global cursor program, then block 152 illustrates a return to normal processing and thereafter, block 154 is utilized to depict the prompting of the user to end or perform another action. Thereafter, the process terminates, as illustrated in block 156.

Figure 11:
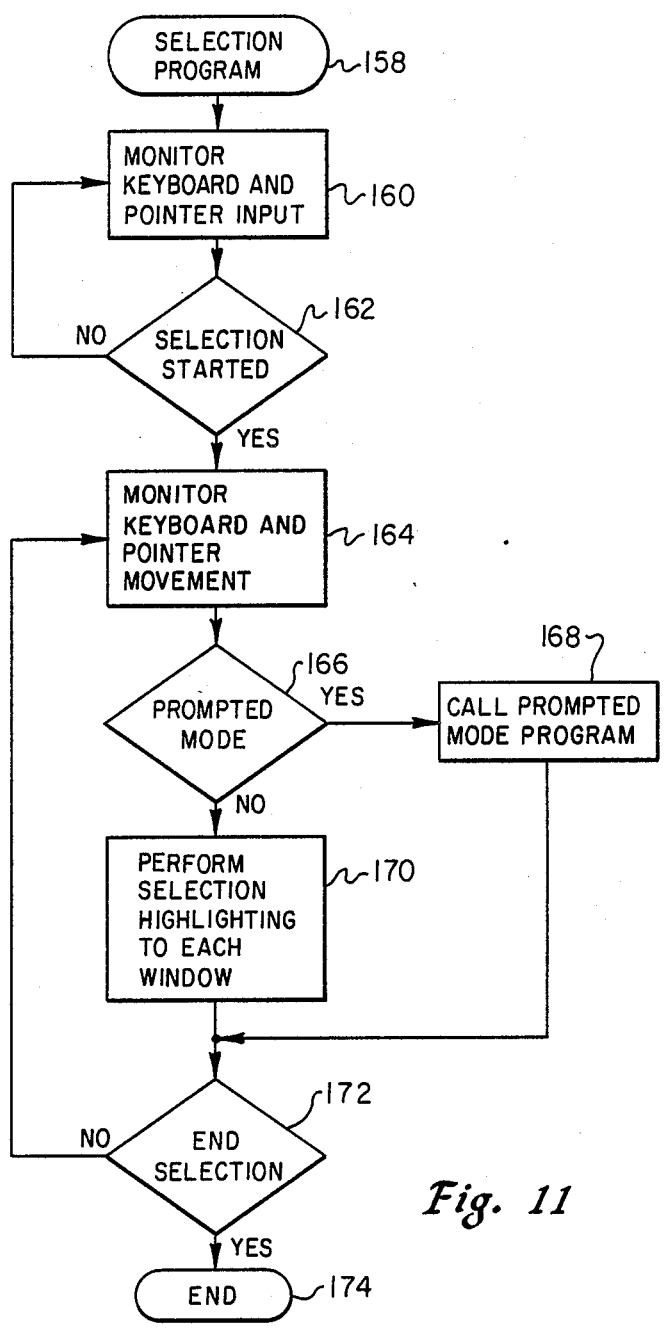
FIG. 11 is a logic flow diagram of a selection program which may be utilized with the method of the present invention.

With reference now to FIG. 11, there is depicted a logic flow diagram of a selection program which may be utilized with the method of the present invention. If the keystroke or pointer input monitored by the logic flow process depicted in FIG. 10 has determined that the user desires a selection program, as determined in block 144 of FIG. 10, then the selection program process depicted in FIG. 11 begins, as illustrated at block 158. Block 160 is utilized to depict the monitoring of the keyboard and pointer inputs and block 162 illustrates the determination of whether or not the selection process has begun. If not, the process returns again to block 160 to continue monitoring keyboard and pointer inputs.

After the selection process has started, as determined by block 162, then block 164 illustrates the monitoring of the keyboard and pointer movement to determine what data the user has selected. Block 166 depicts the determination of whether or not the user has selected a prompted mode of operation and if so, block 168 illustrates the calling of the prompted mode program. If the user has not elected a prompted mode, as depicted by block 166, then block 170 illustrates the performing of selection highlighting in each window. Those skilled in the art will appreciate that this may be accomplished by enhancing the display of the data which has been selected by the user or by utilizing reverse video, as illustrated in FIG. 2. Next, block 172 illustrates a determination of whether or not the selection process has ended and if not, the process returns to block 164 to continue monitoring keyboard and pointer movement. If the process of selection has terminated, then block 174 illustrates the termination of the process.

Referring now to FIG. 12, there is depicted a logic flow diagram of a data entry program which may be utilized with the method of the present invention. If the keystrokes monitored by the process keystrokes program of FIG. 10 have indicated that the user desires to enter data, as determined by block 140 of FIG. 10, then the data entry program illustrated in FIG. 12 is initiated, as depicted in block 176. Block 178 illustrates a determination of whether or not the user has elected the prompted mode and if so, block 180 depicts the calling of the prompted mode program.

If the user has not elected the prompted mode, then block 182 depicts the insertion or replacement of data in each window wherein a global cursor is attached. Next, block 184 illustrates the updating of the cursor or pointer position. Block 186 illustrates the updating of the display buffers for each window and thereafter, block 188 illustrates the outputting of these display buffers to the screen, depicting the updated display with the new data entered therein. Finally, the process returns, as illustrated in block 190.

Figure 13:
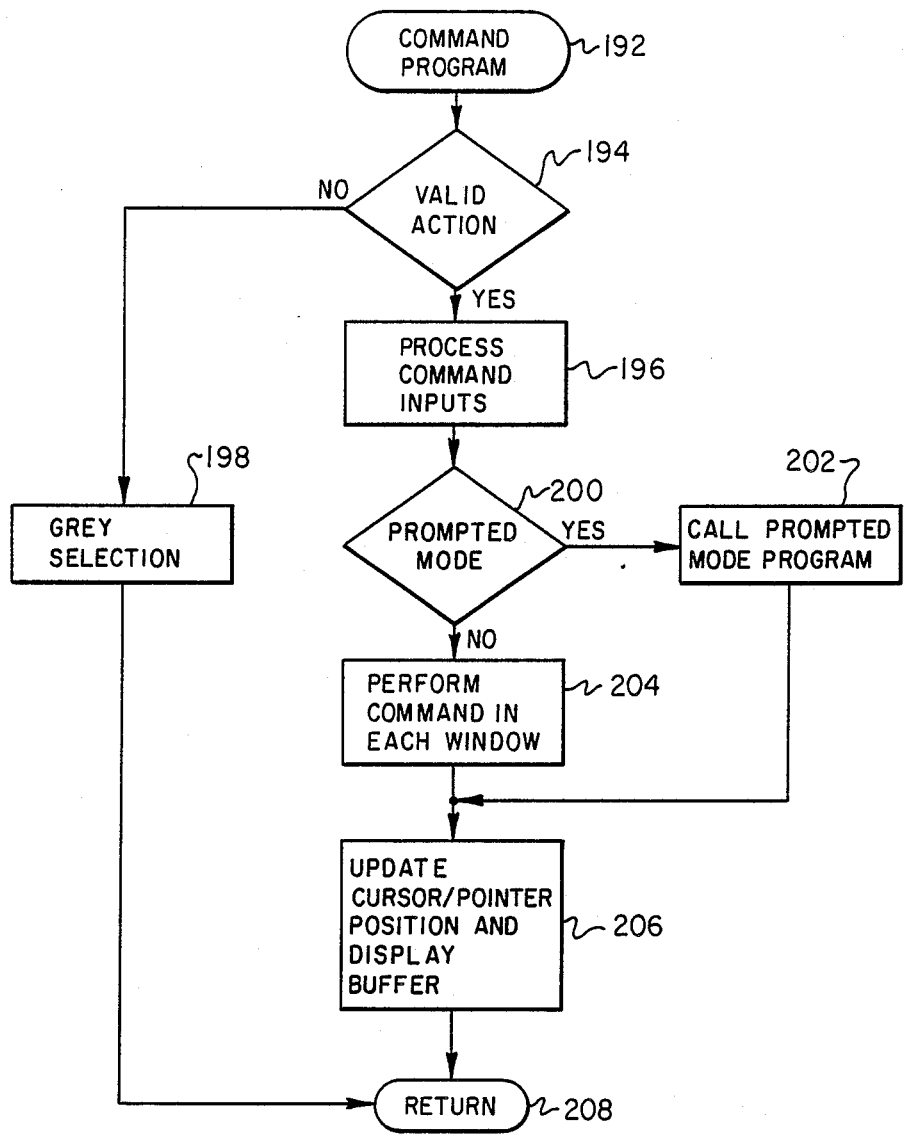
FIG. 13 is a logic flow diagram of a command program which may be utilized with the method of the present invention.

With reference now to FIG. 13, there is depicted a logic flow diagram of a command program which may be utilized with the method of the present invention. In the event the user keystrokes monitored by the logic flow program of FIG. 10 have indicated the user has initiated a command input, then the command call program is initiated as illustrated by block 148 of FIG. 10. The command call program is initiated as illustrated in block 192 of FIG. 13. Block 194 indicates a determination of whether or not the command entered is a valid action. If not, block 198 depicts the display of a "grey" selection. Those skilled in this art will appreciate that in many multi-tasking systems not all commands are valid. Many such systems will display invalid commands in a so-called "grey" mode. Thereafter, the process returns as illustrated in block 208. If the command entered by the user is a valid action, then block 196 depicts the processing of the command inputs. Next, block 200 is utilized to determine whether or not the prompted mode of operation has been selected by the user. If so, block 202 illustrates the calling of the prompted mode program.

In the event the user has elected not to utilize the prompted mode then block 204 illustrates the concurrent performance of the command in each window in which a global cursor is present. Thereafter, block 206 depicts the updating of the cursor/pointer position and the display buffers necessary to depict the window in the altered state which is a result of the user's commands. Again, the program then returns as illustrated in block 208.

Finally, referring to FIG. 14, there is depicted a logic flow diagram of a prompted mode program which may be utilized with the method of the present invention. This prompted mode is utilized when the user does not wish to automatically and systematically change each and every occurrence of the selected text but rather wishes to selectively apply the change to particular ones of the identified text sections. This process begins, as above, with the selection of the prompted mode program, as illustrated in block 210. Next, block 212 is utilized to display the next attached object which has been located by a search program.

Block 214 depicts the prompting of the user for information regarding whether or not the change suggested by the user should be applied to this particular object. Block 216 illustrates a determination of whether or not the change should be applied. If the user determines that the change should be applied, then block 218 depicts the performing of that change in the selected object. If the user determines that the change should not be applied, then block 220 illustrates the determination of whether or not the object in question is the last object identified by the search mode. If not, the process returns to block 212 to display the next object identified by the search mode. If the object currently displayed is the last object identified by the search mode then the process returns, as illustrated in block 222.

While the invention has been particularly shown and described with reference to a preferred embodiment, it will be understood by those skilled in the art that various changes in form and detail may be made therein without departing from the spirit and scope of the invention.

I claim:

1. A method of inputting common data into a plurality of computer application programs which are simultaneously active on a computer system in a plurality of windows, said method comprising the steps of:

setting a display attribute in each of said plurality of windows permitting the utilization of a global cursor;

designating a location within each of said plurality of windows and positioning a global cursor at each of said designated locations;

inputting data at a selected one of said global cursors; and automatically entering said data at each remaining global cursor in response to said inputting.

2. A method of inputting common data into a plurality of computer application programs according to claim 1 wherein said step of designating a location within each of said plurality of windows comprises positioning a pointer utilizing a pointing device at a desired location in each of said plurality of windows.

3. A method of inputting common data into a plurality of computer application programs according to claim 1 wherein said step of inputting data at a selected one of said global cursors comprises entering said data at a keyboard associated with said computer system.

4. A method of concurrent manipulation of data within a plurality of computer application programs which are simultaneously active on a computer system in a plurality of windows, said method comprising the steps of:

setting a display attribute in each of said plurality of windows permitting the utilization of a global cursor;

designating a location with each of said plurality of windows and positioning a global cursor at each of said designated locations;

manipulating data within a selected one of said plurality of windows utilizing a selected one of said global cursors; and concurrently manipulating similar data in an identical manner within each remaining one of said plurality of windows having a global cursor therein.

5. A method of concurrent manipulation of data within a plurality of computer application programs according to claim 4 wherein said step of designating a location within each of said plurality of windows comprises positioning a pointer utilizing a pointing device at a desired location in each of said plurality of windows.

6. A method of concurrent manipulation of data within a plurality of computer application programs according to claim 4 wherein said step of manipulating data within a selected one of said plurality of windows comprises the step of deleting selected data within a selected one of said plurality of windows.

7. A method of concurrent manipulation of data within a plurality of computer application programs according to claim 4 wherein said step of manipulating data within a selected one of said plurality of windows comprises the step of searching for selected data within a selected one of said plurality of windows.

8. A method of concurrent manipulation of data within a plurality of computer application programs according to claim 4 wherein said step of manipulating data within a selected one of said plurality of windows comprises the step of revising selected data within a selected one of said plurality of windows.

* * * * *